Z. Chesebrough,
Dressing Stone.
N° 1,029.  Patented Dec. 10, 1838.
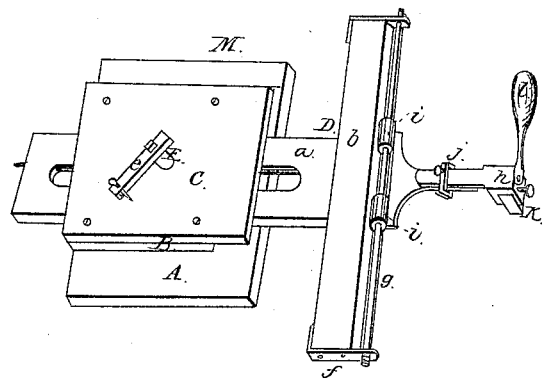
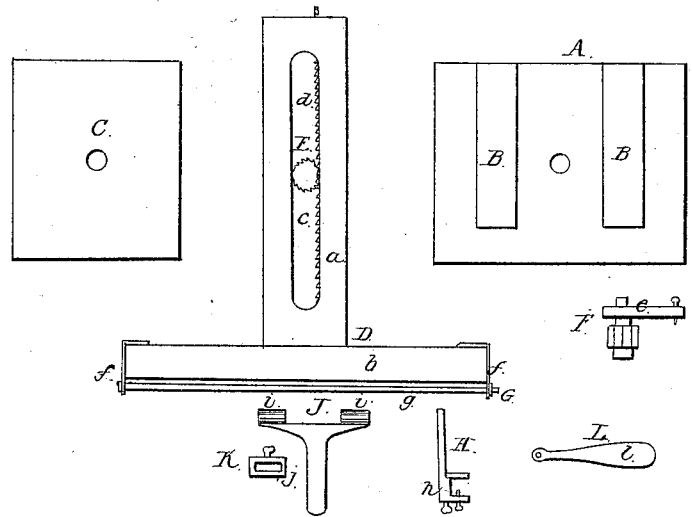

UNITED STATES PATENT OFFICE.

ZEBULON CHESEBROUGH, OF ALDEN, NEW YORK.

MACHINE FOR DRESSING MILLSTONES.

Specification of Letters Patent No. 1,029, dated December 10, 1838.

*To all whom it may concern:*

Be it known that I, ZEBULON CHESEBROUGH, of Alden, in the county of Erie and State of New York, have invented a new and useful Machine for Facing, Furrowing, and Dressing Millstones; and I do hereby declare that the following is a full and exact description of the same.

The machine consists of a bed, a carriage, a crank, an axis rod, a chisel arm, one or more chisels, and a handle of which (machine) at letter M is a perspective view. The bed is composed of four pieces of boards or planks fastened together with rivets, screws or nails. The bottom board is eighteen inches long and fifteen inches wide (as at A). The two middle pieces are each one foot long, three inches wide and one and a half inch thick (as at, B, B). The top board is twelve inches long and fifteen inches wide (as at C) and is fastened to and covers the middle pieces and extends from one edge of the bottom board to the other edge over its middle. The carriage is composed of two pieces of plank one and a half inch thick, the one marked $a$ being thirty inches long and six inches wide and the other ($b$) twenty six inches long and three inches wide, one end of the former being joined to the middle of the other by a mortise and tenon (as at D). The wide part of the carriage has a mortise $c$ cut through it lengthwise fourteen inches long and two inches wide, one end being three inches from the inner edge of the cross-piece. There is a cord $d$ or thong fastened at each end of this mortise designed to wind once around the upright part of the crank (as at E). The crank $e$ is composed of two pieces of wood, the upright part of which is octagonal and about an inch and three quarters in diameter (as at F). The lower end of this is placed in a hole in the center of the bottom board, thence passing upward through the mortise in the carriage and through a corresponding hole in the top board, where by a tenon it receives the arm by which it is turned. On each end of the cross piece of the carriage is fastened by screws a stiff iron strap $f$ protruding in front about one and a fourth inch with a hole through each of the protruding ends three eighths of an inch in diameter to receive the ends of the axis rod $g$. The axis rod is made of three eighths inch iron or steel, is placed in the holes in the straps on the ends of the cross pieces and drawn tight by means of a nut and screw on one end (as at G).

The chisel arm $h$ is made of iron or other metal the outer end of which is one and a half inches wide, one inch thick, with two lips or jaws extending downward from the under side thereof about two inches in length and half an inch thick and about one inch asunder, forming a stock or mouth to hold the chisels (as at H). The other end is attached to the axis rod in two places $i$ $i$ six or eight inches as under or by a tube encircling the rod five or six inches (as at I). These two ends of the chisel arm are lapped together four or five inches and are made in two pieces for the purpose of regulating the striking of the chisels and are fastened together by means of a clasp and screw $j$ (see K). The chisels $k$ are solid pieces of steel about three inches long one and a half inch wide and one eighth of an inch thick, diminishing abruptly to an edge at the lower end, one or more of which are placed between the jaws of the chisel arm and held firmly by a screw which passes through one of the jaws. The whole arm is so constructed as to slide freely along the axis rod, carrying the chisel steadily nearly the length of the rod parallel thereto, &c.

The handle $l$, designed for one hand, is twelve inches long, fastened to the outer end of the chisel arm by a pin on which it freely turns (as at L). This description may be considered as suited in size to common mill stones, it may be varied to suit the intended application.

Manner of using: Fasten the bed by means of nails or screws to a larger board, place the whole on the stone (with sufficient weights on the larger board to keep all stationary) in such a position as to bring the form of the machine and axis rod, parallel with the furrows or lines to be cut, then with one hand turn the crank and throw the carriage out in such a position that the chisels will strike the line or lines intended to be cut and with the other handhold of the handle peck the line through or as far as you please, which will be straight and uniform. By turning the crank the carriage may be thrown out or drawn back at pleasure for the purpose of pecking a new line of furrows until a whole section is completed. For the different purposes of facing, furrowing and dressing the chisels may be varied so as to cut straight or angling, &c., by means of the clasp and screw which unite the two ends of the chisel arm.

What I claim as my invention and desire to secure by Letters Patent is—

The combination of the chisel stock with the axis rod and the carriage as herein described.

ZEBULON CHESEBROUGH.

Witnesses:
 THOMAS CHURCH,
 JAMES PERRY.